US007300060B2

(12) United States Patent
Zagres

(10) Patent No.: US 7,300,060 B2
(45) Date of Patent: Nov. 27, 2007

(54) SEAL STAGING SYSTEM

(75) Inventor: David P. Zagres, Huntington Beach, CA (US)

(73) Assignee: Flowserve Management Company, Irving, TX (US)

( * ) Notice: Subject to any disclaimer, the term of this patent is extended or adjusted under 35 U.S.C. 154(b) by 113 days.

(21) Appl. No.: 11/109,600

(22) Filed: Apr. 19, 2005

(65) Prior Publication Data

US 2005/0230921 A1 Oct. 20, 2005

Related U.S. Application Data

(60) Provisional application No. 60/563,418, filed on Apr. 19, 2004.

(51) Int. Cl.
*F16J 15/34* (2006.01)
(52) U.S. Cl. ........................................ 277/408; 277/365
(58) Field of Classification Search ................. 277/365, 277/408
See application file for complete search history.

(56) References Cited

U.S. PATENT DOCUMENTS

| 3,227,463 | A | | 1/1966 | Wiese |
| 3,334,905 | A | * | 8/1967 | Horwitz et al. .............. 277/365 |
| 3,360,272 | A | | 12/1967 | Blom et al. |
| 3,459,430 | A | | 8/1969 | Ball |
| 3,628,799 | A | | 12/1971 | Wiese et al. |
| 3,813,103 | A | | 5/1974 | Wiese |
| 3,858,890 | A | | 1/1975 | Wiese |
| 4,272,084 | A | | 6/1981 | Martinson et al. |
| 4,838,559 | A | | 6/1989 | Guardiani et al. |
| 4,848,774 | A | | 7/1989 | Nyilas et al. |
| 5,865,418 | A | * | 2/1999 | Nakayama et al. ........... 251/11 |
| 6,446,976 | B1 | | 9/2002 | Key et al. |
| 6,811,155 | B2 | | 11/2004 | Takahashi |
| 7,014,192 | B2 | * | 3/2006 | Takahashi et al. .......... 277/361 |
| 2004/0129315 | A1 | * | 7/2004 | Dario et al. .............. 137/487.5 |
| 2004/0226613 | A1 | * | 11/2004 | Ono .......................... 137/468 |

FOREIGN PATENT DOCUMENTS

| DE | 20 30 133 A1 | 12/1971 |
| EP | 0 426 041 A | 5/1991 |

(Continued)

OTHER PUBLICATIONS

Wavy Face Upgrade; N-7500 Nuclear Mechanical Seal; Apr. 2003; pp. 1-4; Flowserve Corporation; USA.

(Continued)

*Primary Examiner*—Alison K Pickard
(74) *Attorney, Agent, or Firm*—Dinsmore & Shohl LLP

(57) ABSTRACT

A staged seal assembly having a plurality of staged seals and an external pressure breakdown device connected to the seal assembly and configured to be connected to an external device, wherein each staged seal includes a shaft seal and a seal bypass. The seal bypass includes a pressure breakdown device and directs a portion of fluid through the pressure breakdown device bypassing the respective shaft seal. The staged seal assembly may be configured to be installed in a new installation or replace an existing, seal assembly while substantially maintaining equal pressure reductions across each staged seal and substantially matching the fluid parameters of an external device originally connected to the seal assembly being replaced.

22 Claims, 3 Drawing Sheets

FOREIGN PATENT DOCUMENTS

| | | |
|---|---|---|
| EP | 0 446 531 A | 9/1991 |
| JP | 59 080568 A | 8/1984 |

OTHER PUBLICATIONS

Nuclear Power; Mar. 2003; pp. 1-20; Flowserve Corporation; USA.

EPRI Licensed Material; MCP Seal Maintenance Guide; pp. 1-63.

J.A. Marsi; Development of a 9 Inch (228 mm) Nuclear Primary Coolant Seal; ASME-STLE Tribology Conference; Baltimore, MD; Oct. 16-19, 1988.

J.A. Marsi; Station Blackout Test on a Reactor Coolant Pump Mechanical Seal; Byron Jackson Products; BW/IP International, Inc.; Los Angeles, CA.

* cited by examiner

US 7,300,060 B2

SEAL STAGING SYSTEM

CROSS REFERENCE TO RELATED APPLICATIONS

This application is a Non-Provisional of Provisional of U.S. Provisional Patent Application Ser. No. 60/563,418 filed Apr. 19, 2004.

BACKGROUND OF THE INVENTION

The present invention generally relates to staged seal assemblies, particularly for extreme duty applications in pumps, mixers, etc. More particularly, the present invention relates to a staged seal assembly having multiple staged seals and an external pressure breakdown device connected to an external device. Even more particularly, the seal assembly may be configured to be installed in a new installation or replace an existing seal assembly (e.g., a non-staged seal assembly) without requiring modifications to existing, external systems originally connected to the replaced seal assembly.

Staged seal assemblies are known, wherein the seal assembly includes multiple staged seals in series along a rotating shaft to reduce an operational pressure to a fraction of its original value in order to reduce the severity of the seal duty, to provide operational redundancy (i.e., seal redundancy), or to meet a certain seal leakage criteria. The reduction or division of pressure is established by a flow path with a controlled pressure reducing mechanism or device (e.g., orifices, length of coiled tubing, valves, etc.), which is placed in parallel with each seal stage. The flow through the parallel path is typically much greater than the seal leakage such that normal variations to the seal leakage of any stage results in only small changes in the breakdown of the staging pressure(s) (sometimes referred to as staging "stiffness"). However, conventional staged seal assemblies do not contain an external pressure breakdown device, let alone, one configured to connect to external devices or systems. External pressure breakdown device, as defined herein, is a pressure breakdown device additional to the one pressure breakdown device per staged seal found in staged seals.

Moreover, current staged seal assemblies are not configured to replace existing non-staged seal assemblies without requiring modifications to external devices or systems. Non-staged seal assemblies are mechanical seals that include multiple seals in series along a rotating shaft but lack the parallel flow path that allows a portion of fluid to flow through a pressure breakdown device. Therefore, non-staged seal assemblies do not have controlled pressure breakdown across each seal. The pressure breakdown device is variable, depending upon the ratio of one seal leakage to another and the external boundary conditions. Generally, the non-staged seals have very high seal leakage (e.g., 1-8 gal/min in extreme duty applications) due to the severe pressure across the seal (e.g., 2250 psi at the first seal). Such non-staged seal assemblies have increased seal wear and maintenance requirements and lack redundancy found with staged seals.

Non-staged seals were placed into service in extreme duty applications. Due to the high leakage and increased risk of seal failure due to the pressure at the seal, particularly at the first seal, external devices were connected to the seal assemblies such as monitoring/measuring equipment, volume control tanks, etc. These systems were designed for the specific fluid flow parameters (e.g., pressure and flow) of the flow at the location where the external device is connected to the seal assembly. For example, many non-staged seal assemblies had external devices such as a flow monitor or volume control tank connected to them after the first seal such that the leakage past this first seal could be monitored or controlled before moving onto the second seal. Thus, the external device was designed for that specific fluid's flow parameters.

This is problematic when replacing or retrofitting a non-staged seal. It is desirable to replace the non-staged seal assembly with a staged seal assembly to achieve the increase reliability and redundancy of staged seals over non-staged seals. However, a staged seal has different fluid flow parameters after each of its staged seal versus the random fluid flow parameters found after each of the non-staged seals. Therefore, if one would replace a non-stage seal assembly with a staged seal assembly, it would generally require replacing or modifying all the existing external equipment originally connected to the non-staged seal assembly (e.g., fluid flow monitoring equipment, volume control tanks, etc.) so that the external device's fluid flow capabilities match the fluid flow of the new staged seal assembly. These modifications, particularly within primary coolant pumps of nuclear facilities, can be extensive and expensive to undertake. This extensive and costly undertaking has prevented companies from replacing existing, non-staged seal assemblies with staged seal assemblies, thus preventing the companies from achieving the benefits of staged seals (e.g., increased seal life and redundancy). Moreover, conventional staged seal assemblies are not designed to have external channels that feed external devices connected to the system diverting some of the fluid from the staged seal assembly to the external device while maintaining approximately equal pressure breakdowns across each staged seal of the seal assembly.

Accordingly, there is a need for improved staged seal assemblies.

SUMMARY OF THE INVENTION

Accordingly, the present invention is intended to address and obviate problems and shortcomings and otherwise improve previous mechanical seal systems.

One exemplary embodiment of the present invention is a staged seal assembly that comprises a plurality of staged seals configured to be disposed in series along a shaft. Each staged seal includes a shaft seal and a seal bypass. The seal bypass is configured to direct a portion of fluid through a pressure breakdown device around the seal of the respective staged seal. The staged seal assembly of the exemplary embodiment also includes an external pressure breakdown device that is connected to and/or part of the seal assembly and also connected to an external device.

Another exemplary embodiment of the present invention is a staged seal assembly that comprises a plurality of staged seals disposed in series along a shaft. The plurality of staged seals includes at least one staged seal comprising a shaft seal and a seal bypass and a final staged seal disposed consecutive to the at least one staged seal. The final staged seal also includes a shaft seal and a seal bypass. In this exemplary embodiment, the seal bypass of the at least one staged seal is configured to direct a portion of fluid through a pressure breakdown device around the shaft seal of this staged seal to a consecutive one of the plurality of staged seals, and the seal bypass of the final staged seal is configured to direct a portion of fluid through a pressure breakdown device around the shaft seal of the final staged seal to a second external channel. The staged seal assembly also includes a first external channel that is fluidly connected to the seal assembly and to an external device. The first external channel comprises an external pressure breakdown device that is configured to adapt the staged seal assembly to replace an existing, non-staged seal assembly along a shaft.

An exemplary method of the present invention includes a method for replacing a non-staged seal assembly with a staged seal assembly. The exemplary method includes providing a staged seal assembly having a plurality of staged seals in series and connecting an external pressure breakdown device to the staged seal assembly. The external pressure breakdown device is configured to be connectable to and match the fluid parameter of an existing, external device that was originally connected to the non-staged seal assembly targeted to be replaced by the staged seal assembly.

BRIEF DESCRIPTION OF THE DRAWINGS

While the specification concludes with claims particularly pointing out and distinctly claiming the invention, it is believed the same will be better understood from the following description taken in conjunction with the accompanying drawings in which:

Figure 1:
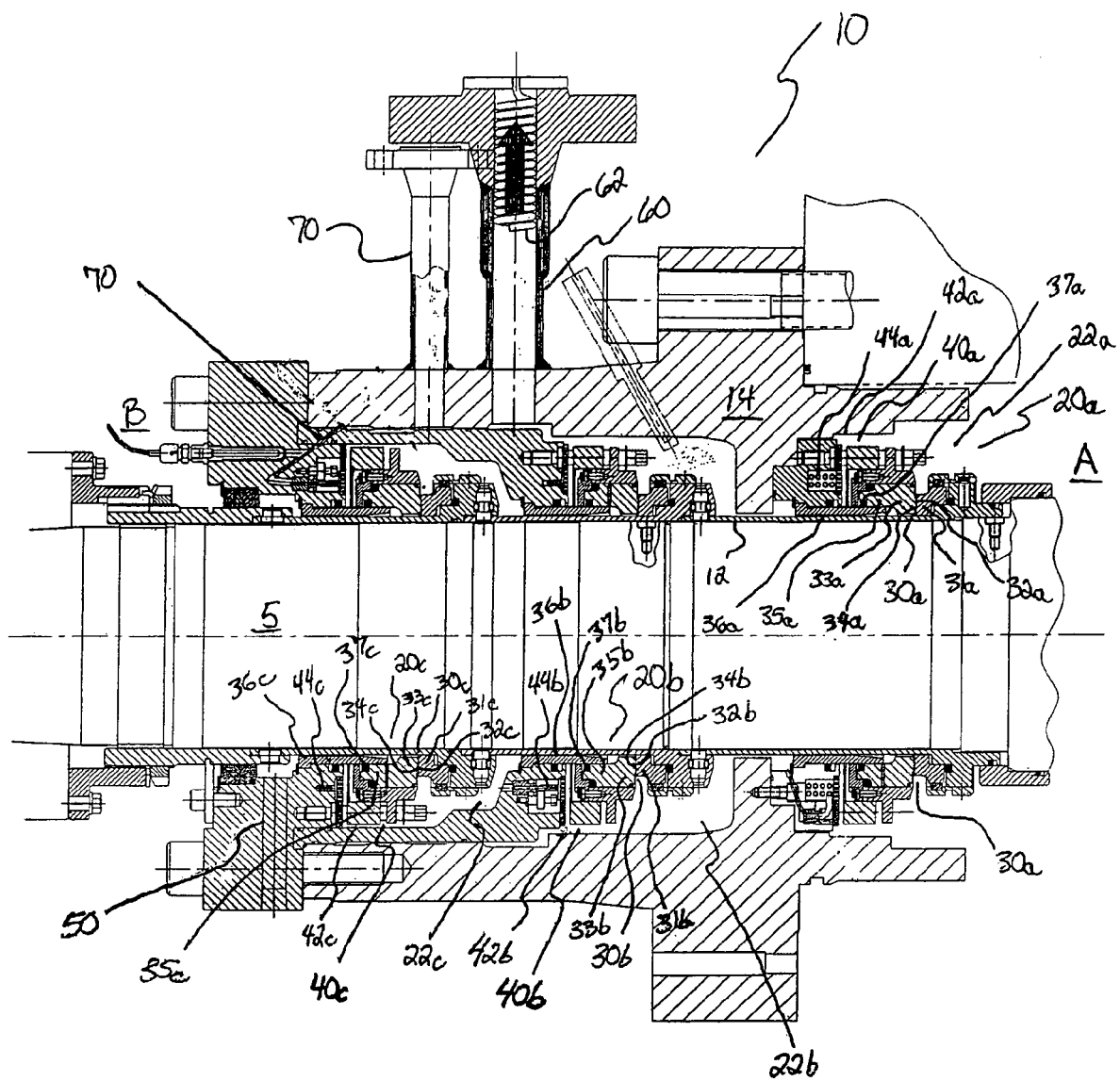
FIG. 1 is a cross sectional view of an exemplary embodiment of the staged seal assembly according to the present invention.

The embodiments set forth in the drawings are illustrative in nature and not intended to be limiting of the invention defined by the claims. Moreover, individual features of the drawings and the invention will be more fully apparent and understood in view of the detailed description.

DETAILED DESCRIPTION OF THE INVENTION

Reference will now be made in detail to various embodiments of the invention, examples of which are illustrated in the accompanying drawings, wherein like numerals indicate similar elements throughout the views.

The present invention provides an improved staged seal assembly, particularly as a retrofit or replacement seal assembly (e.g., seal cartridge) for existing, seal assemblies (e.g., seal cartridge) used in extreme duty applications. Even more particularly, one exemplary embodiment of the present invention provides a staged seal assembly configured to replace an existing, non-staged seal assembly used in a primary coolant pump for a reactor in nuclear facilities without having to change-out or modify the existing external systems that were originally designed for and connected to the existing, non-staged seal assembly.

Figure 2:
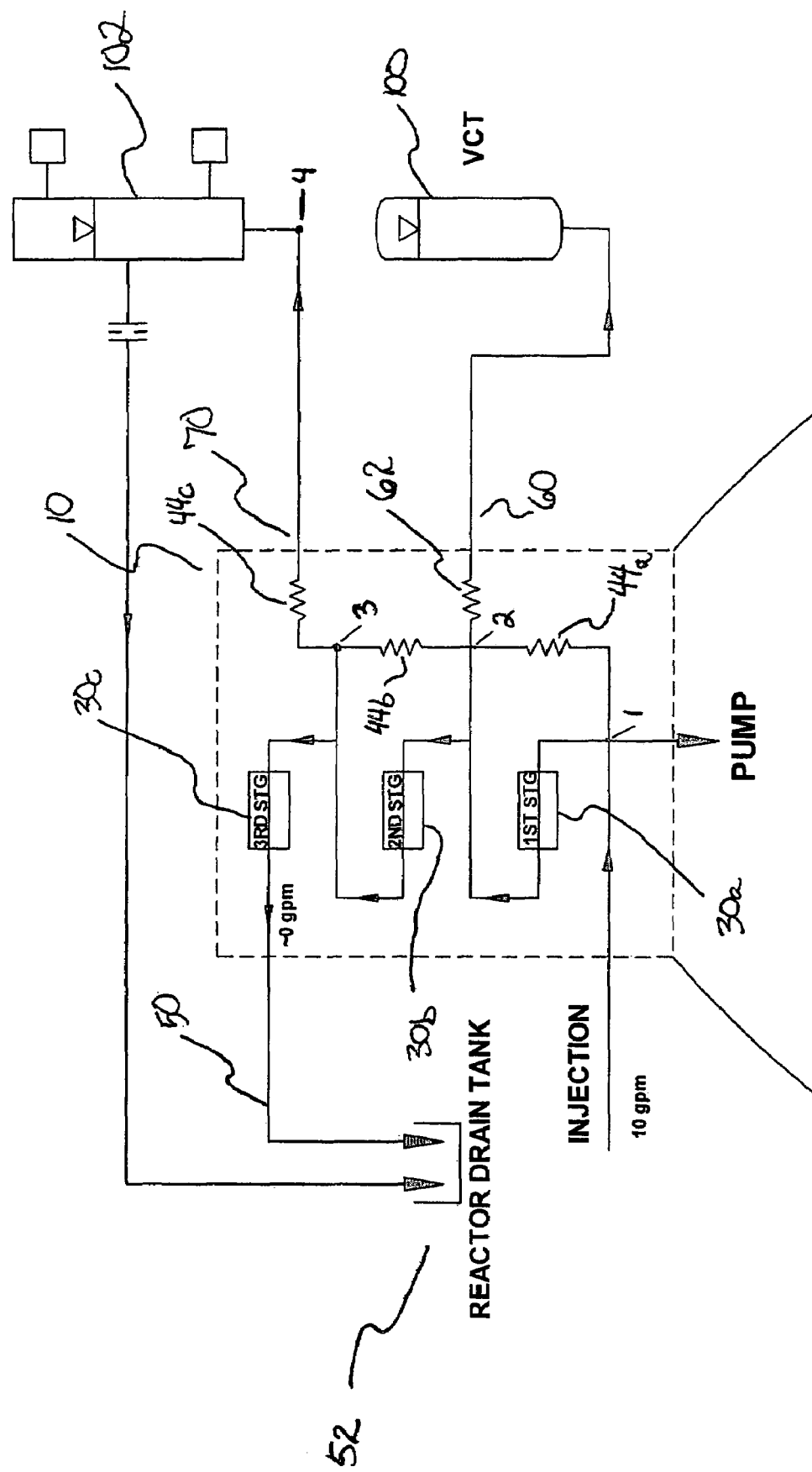
FIG. 2 is a schematic view of the staged seal assembly illustrated in FIG. 1.
Figure 3:
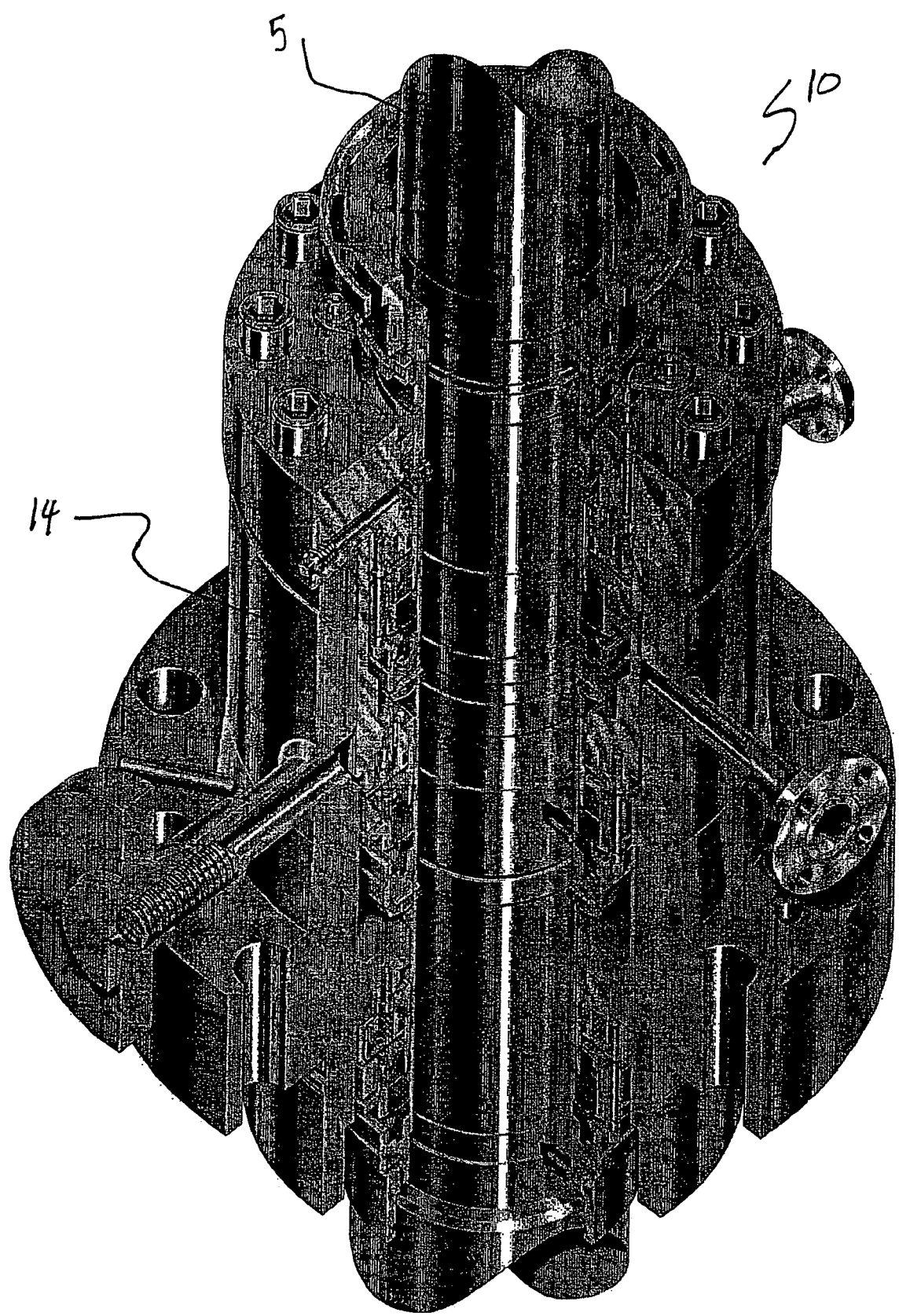
FIG. 3 is a perspective cut-away view of the staged seal assembly illustrated in FIG. 1.

Referring to FIGS. 1-3, an exemplary embodiment of a staged seal assembly 10 of the present invention is shown as generally including a seal assembly housing 14, shaft sleeve 12, multiple staged seals (e.g., first staged seal 20a, second staged seal 20b, and third staged seal 20c) and a first external channel 60 having an external pressure breakdown device 62 that is fluidly connected to the seal assembly and a device 100 external to the staged seal assembly 10. Fluidly connected, as used herein, is defined as a connection configured such that fluid may move, circulate, or flow through such connection. Staged seals 20a, 20b, and 20c, each include a shaft seal (e.g., 30a, 30b, and 30c, respectively) positioned in series along a rotating shaft 5 to provide multiple consecutive sealing surfaces from a high pressure side A (e.g., right side of FIG. 1) to a low pressure side B (e.g., left side of FIG. 1) of seal assembly 10. Such staged seals also include a seal bypass (e.g., 40a, 40b, and 40c) that provides a parallel flow path for a portion of the high pressure fluid to bypass or circulate around the shaft seal (e.g., 30a, 30b, and 30c) of its respective stage. For simplicity, the multiple staged seals will be illustrated with reference to first staged seal 20a and should be understood that like components in consecutive staged seals (e.g., second stage seal 20b and third stage seal 20c) will have like reference numbers designated by 'b' and 'c' for second and third staged seals, respectively.

It is understood that the multiple staged seals (e.g., 20a, 20b, and 20c) of the present invention may be any conventional or yet-to-be developed mechanical, staged seals for providing a seal along a rotating shaft for a variety of equipment such as pumps, compressors, mixers, etc without departing from the spirit and scope of the present invention. In an exemplary embodiment, the staged seals are designed for extreme duty applications such as primary coolant pumps. An exemplary embodiment of a mechanical seal assembly having multiple staged seals that may be used in conjunction with the present invention is shown and described in commonly assigned U.S. Pat. No. 4,586,719 to Marsi et al., and herein incorporated by reference. As shown in FIG. 1, staged seal 20a includes a staged seal cavity 22a that fluidly connects to both shaft seal 30a and seal bypass 40a (parallel flow paths). Shaft seal 30a may include a rotatable seal ring 31a and a stationary seal 33a, wherein one may be resiliently biased toward the other. The pair of seal rings 31a and 33a include relatively rotating, opposed, and lapped sealing faces 32a and 34a across which the flow of high pressure fluid from high pressure side (A) to lower pressure side (B) in housing 14 is substantially prevented. Seal ring 33a may be made from a variety of materials (e.g., carbon) and seal ring 31a may be made from a variety of materials, including but not limited to a harder material, such as titanium carbide, silicon carbide, or similar materials.

Stationary seal ring 33a may have a reduced inner diameter flange 35a that extends rearwardly and partially encompasses a balance sleeve device 36a. Stationary seal ring 33a is centered on balance sleeve device 36a by an elastomeric gasket 37a disposed between stationary seal ring 33a and sleeve device 36a. Such an elastomeric gasket permits limited axial movement of seal ring 33a relative to sleeve device 36a. Seal ring 33a is configured to connected to body 14 to prevent rotation of seal ring 33a relative to body 14. Any variety of conventional or yet-to-be developed methods as known to one of ordinary skill in the art to hold seal ring 33a stationary and allow rotating seal 31a to rotate may be used without departing from the spirit and scope of the present invention and need not be described in detail herein. Moreover, it is understood that bypass seal 30a may include other staged seal components, including but not limited to coil springs, spring retainers, elastomeric gaskets, O-rings, cap screws, retainers, adaptors, etc., as known to one of ordinary skill in the art and need not be described in detail herein.

Generally, such multiple staged seals provide approximately an equal pressure breakdown across each staged seal, to increase the life of each seal and to provide redundancy of the seals. For example, seal assembly 10 may be configured to provide approximately equal pressure breakdown (reduction) across each staged seal, (e.g., pressure breakdown equal to approximately 750 psi across each staged seal). Each of the staged seals accomplish the pressure breakdown or reduction via the parallel flow path of seal bypass 40a, which directs the fluid that enters seal bypass 40a through a pressure breakdown device 44a and around shaft seal 30a. As described above, the flow through this parallel path (e.g., seal bypass 40a) is generally greater than the leakage through the shaft seal (e.g., shaft seal 30a) of that respective stage. Pressure breakdown device, as used herein, is defined as a device or mechanism configured to reduce, divide, or breakdown the pressure of the fluid passing through the device by a particular amount upon its exit from the device (e.g., orifices, coiled tubing, valves, or any other pressure breakdown devices known to one of ordinary skill in the art).

In the exemplary embodiment, seal bypass 40a includes a bypass flow channel 42a connected to cavity 22a and configured such that a portion of the high pressure fluid passes through first pressure breakdown device 44a bypassing respective shaft seal 30a of staged seal 20a, and a portion of high pressure fluid leaks through shaft seal 30a. The portion of fluid that circulates through pressure breakdown device 44a (i.e., bypasses shaft seal 30a) enters into a second staged seal cavity 22b and has a reduced fluid pressure (node 2, FIG. 2). Similarly, a portion of the fluid in cavity 22b will leak through shaft seal 30b, and a portion will bypass shaft seal 30b and circulate or pass through a pressure breakdown device 44b. Once this portion of fluid circulates through breakdown device 44b, it will have a reduced fluid pressure as it enters a third staged seal cavity 22c (node 3, FIG. 2). Finally, a portion of the fluid in cavity 22c will leak through shaft seal 30c, and a portion will be directed by seal bypass 40c to bypass shaft seal 30c and to pass through a pressure breakdown device 44c. The portion of fluid that leaks through shaft seal 30c is minimal in the exemplary embodiment (about 0 gal/min) and may drain (50) into a connected drain tank 52.

The portion of fluid that circulates through third breakdown device 44c will have a reduced fluid pressure as it exits breakdown device 44c (node 4, FIG. 2). Breakdown device 44c may be fluidly connected to a second external channel 70, which in turn, may be connected to an external device (e.g., head tank 102). Head tank 102 may also be fluidly connected to reactor drain tank 52, allowing the portion of fluid that exits break down device 44c to pass into head tank 102 and then into reactor drain tank 52. The pressure breakdown devices may comprise a variety of shapes, sizes, and configurations as known to one of ordinary skill in the art, including but not limited to tubing, coiled tubing, controlled, active, and any other known pressure breakdown devices. Active pressure breakdown devices include pressure breakdown devices, wherein such device is characteristics are changeable by some controller input. Seal assembly 10 may comprise any number of stages or staged seals such as the three that are found in this exemplary embodiment.

In the exemplary embodiment, seal assembly 10 is a staged seal assembly designed or configured to replace an existing seal assembly (e.g., staged or non-staged) without requiring modifications to existing, external devices or systems previously connected to the seal assembly being replaced. In many instances, the existing seal assembly will have one or more external channels connecting it to existing external devices or systems such as monitoring/measurement equipment, volume control tank 100, head 102. These external channels output the fluid at a particular fluid parameter (e.g., flow and pressure) and thus the external devices have been designed to receive and handle these particular fluid parameters. In the exemplary embodiment, staged seal assembly 10 is configured to replace an existing, non-staged seal assembly that has two external channels and thus seal assembly 10 includes a first external channel 60 that fluid connects seal assembly 10 to an existing external volume control tank 100 and a second external channel 70 that fluidly connects seal assembly 10 to an existing volume control tank 102.

In the exemplary embodiment, seal assembly 10 includes an external pressure breakdown device 62 fluidly connected to first external channel 60. First external channel 60 directs a portion of fluid from seal assembly 10 through pressure breakdown device 62 to volume control tank 100. It is understood that first external channel 60 and external pressure breakdown device 62 may be connected to seal assembly 10 at any desired location. In the exemplary embodiment shown, external channel 60 and external pressure breakdown device 62 are fluidly connected to second cavity 22b of seal assembly 10 between first staged seal 20a and second staged seal 20b, thus allowing a portion of the fluid in this cavity to flow through pressure breakdown device 62 rather than second staged seal 20b (i.e., shaft seal 30b and second pressure breakdown device 44b). It is also understood seal assembly 10 of the present invention may not include external channel 60 and simply fluidly connect external pressure breakdown device 62 directly to seal assembly 10 and may include more than one external pressure breakdown device without departing from the spirit and scope of the present invention.

External pressure breakdown device 62 of the present invention is configured to maintain the approximately equal pressure breakdown across each of the staged seals of seal assembly 10 while matching (or not exceeding) the fluid parameters required by the existing, external devices (e.g., control tank 100 and volume control tank 102). For example, external pressure breakdown device 62 may be configured to maintain the following pressure breakdowns: first staged seal reduces initial pressure from approximately 2250 psi at node 1 (FIG. 2) to approximately 1300 psi (a breakdown of 950 psi) at node 2 (FIG. 2); second staged seal reduces pressure from approximately 1300 psi to approximately 300 psi (a breakdown of 1000 psi) at node 3 (FIG. 2); and third staged seal reduces pressure from 300 psi to approximately 0 psi (a breakdown of 300 psi) at node 4 (FIG. 2). While maintaining these pressure breakdowns, external pressure breakdown device 62 is also configured to substantially match (or not exceed) the existing required fluid pressure of approximately 20 psi to approximately 100 psi and fluid flow of approximately 1 gal/min to approximately 8 gal/min from first external channel 60 to volume control tank 100 and the existing required fluid pressure of approximately 0.5 psi to approximately 10 psi and fluid flow of approximately 0.1 gal/min to approximately 1 gal/min from second external channel 70 to second volume control tank 102.

In another exemplary embodiment, seal assembly 10 may include all the components as shown and described above and further include one or more valves (not shown) configured to close each seal assembly outlet (e.g., external channels 60 and 70). The valve is configured to shut-off fluid flow leaving seal assembly 10 and thus because of continuity all fluid flow through seal assembly 10 will cease. Seal assembly 10 may include a bimetallic strip connected to or incorporated into the valve and configured to sense the temperature of the fluid and operate the valve to shut off the fluid flow from seal assembly 10 when the fluid temperature exceeds a set value to protect the seal assembly. In yet another exemplary embodiment, in place of the bimetallic strip set forth above, seal assembly 10 may include a thermal shape memory alloy connected to or incorporated into the valve and configured to operate the valve to shut off the fluid flow from seal assembly 10. These exemplary embodiments of a temperature triggered shut-off system is particularly useful in primary coolant pumps during a plant shut-down or black-out.

Accordingly, this invention is intended to embrace all alternatives, modifications and variations that have been discussed herein, and others that fall within the spirit and broad scope of the claims.

What is claimed is:

1. A staged seal assembly, comprising:
   a first staged seal for sealing along a rotating shaft, said first staged seal comprising a first shaft seal and a first seal bypass, wherein said first seal bypass directs a portion of fluid through a first pressure breakdown device that is parallel to said first shaft seal;
   a second staged seal for sealing along said rotating shaft disposed in series with said first staged seal, said second staged seal comprising a second shaft seal and a second seal bypass, wherein said second seal bypass is fluidly connected to said first seal bypass at a first node and directs a portion of fluid from said first seal bypass through a second pressure breakdown device that is parallel to said second shaft seal; and
   a third pressure breakdown device that is fluidly connected to said first and second seal bypasses at said first node such that a portion of fluid from said first node through said third pressure breakdown device.

2. The seal assembly according to claim 1, wherein said third pressure breakdown device is configured to adapt said staged seal assembly to replace an existing, non-staged seal assembly along a shaft.

3. The seal assembly according to claim 1, wherein said third pressure breakdown device operates to maintain substantially equal pressure reductions across each of said first and second staged seals.

4. The seal assembly according to claim 1, wherein said third pressure breakdown device is configured to substantially match the flow and pressure parameters of an existing, external device.

5. The seal assembly according to claim 4, wherein said flow parameter is from about 1 g/min. to about 8 g/min and said pressure parameter is from about 5 psi to about 100 psi.

6. The seal assembly according to claim 1, wherein said first and second pressure breakdown devices of said respective first and second staged seals are controlled pressure breakdown devices.

7. The seal assembly according to claim 1, wherein said first and second pressure breakdown devices of said respective first and second staged seals are active pressure breakdown devices.

8. The seal assembly according to claim 1, further comprising:
   an inlet configured to circulate a fluid into said first staged seal;
   a valve connected to an outlet of said seal assembly; and
   a bimetallic strip connected to said valve and configured to close said valve at a set temperature of the fluid entering said first staged seal.

9. The seal assembly according to claim 1, further comprising:
   a valve connected to an outlet of said seal assembly; and
   a thermal shape memory alloy connected to said valve and configured to close said valve at a set temperature of the fluid entering said first staged seal.

10. The staged seal assembly according to claim 1, wherein said third pressure breakdown device is fluidly connected to an existing external device such that fluid from said seal assembly may flow through said third pressure breakdown device into said external device.

11. The staged seal assembly according to claim 10, wherein said external device is a volume control tank.

12. The staged seal assembly according to claim 1, wherein said staged seal assembly provides a seal for a shaft of a primary coolant pump.

13. The staged seal assembly according to claim 1, wherein said staged seal assembly provides a seal for a shaft of a mixer.

14. The staged seal assembly according to claim 1, wherein said first, second, and third pressure breakdown devices are a length of coiled tubing.

15. The seal assembly according to claim 1, wherein said third pressure breakdown device is operable to cause fluid exiting said third pressure breakdown device to have fluid parameters that substantially match the fluid parameters of an existing, external device.

16. The staged seal assembly according to claim 1, wherein said third pressure breakdown device permits the adjustment of a first pressure reduction across said first staged seal and a second pressure reduction across said second staged seal such that said first and second pressure reductions are unequal to one another.

17. The staged seal according to claim 1, wherein a first pressure reduction across said first staged seal is about 950 psi and a second pressure reduction across said second staged seal is about 1000 psi.

18. A method for replacing a non-staged seal assembly with a staged seal assembly, comprising
   removing a non-staged seal assembly from a shaft;
   providing a staged seal assembly according to claim 1;
   connecting said third pressure breakdown device from the first node to an existing external device;
   manipulating a pressure reduction across said third pressure breakdown in order to control a first pressure reduction across said first stage seal and a second pressure reduction across said second stage seal.

19. The method according to claim 18, wherein said first and second pressure reductions are not equal to one another.

20. A staged seal assembly, comprising:
   a first staged seal for sealing along a rotating shaft, the first staged seal comprising a first shaft seal and a first seal bypass, wherein the first seal bypass directs a portion of fluid through a first pressure breakdown device that is parallel to the first shaft seal;
   a second staged seal for sealing along the rotating shaft disposed in series with the first staged seal, the second staged seal comprising a second shaft seal and a second seal bypass, wherein the second seal bypass is fluidly connected to the first seal bypass and directs a portion of fluid from the first seal bypass through a second pressure breakdown device that is parallel to the second shaft seal;
   a third stage seal for sealing along the rotating shaft disposed in series with the second staged seal, the third staged seal comprising a third shaft seal and a third seal bypass, wherein the third seal bypass is fluidly connected to the second seal bypass and directs a portion of fluid from the second seal bypass through a third pressure breakdown device that is parallel to the third shaft seal; and a flow channel having a fourth pressure breakdown device that is fluidly connected between the first and second seal bypasses and directs a portion of fluid from the first and second bypasses through the fourth pressure breakdown device.

21. The seal assembly according to claim 20, wherein said pressure reduction across said first staged seal is from about 850 psi, to about 1050 psi, said second staged seal is from 900 psi to about 1000 psi, and said third stage is from 200 psi to about 400 psi.

22. A staged seal assembly, comprising:
two or more shaft seals disposed in series for sealing along a rotating shaft;
two or more pressure breakdown devices, wherein each one of said two or more pressure breakdown devices provides a parallel flow path around a respective one of said two or more shaft seals, and wherein said two or more pressure breakdown devices are connected to each other in series;
an external pressure breakdown device for controlling pressure reductions across said two or more shaft seals and fluidly connected between two of said two or more pressure breakdown devices.

* * * * *